(12) United States Patent
Heil (10) Patent No.: US 10,583,989 B2
(45) Date of Patent: Mar. 10, 2020

(54) DEVICE FOR TRANSPORTING PACKAGINGS

(71) Applicants: SIG Technology AG, Neuhausen am Rheinfall (CH); Andrea Heil, Moenchengladbach (DE)

(72) Inventor: Michael Heil, Moenchengladbach (DE)

(73) Assignee: SIG Technology AG, Neuhausen am Rheinfall (CH)

( * ) Notice: Subject to any disclaimer, the term of this patent is extended or adjusted under 35 U.S.C. 154(b) by 0 days.

(21) Appl. No.: 16/064,263

(22) PCT Filed: Dec. 8, 2016

(86) PCT No.: PCT/EP2016/080277
§ 371 (c)(1),
(2) Date: Jun. 20, 2018

(87) PCT Pub. No.: WO2017/108434
PCT Pub. Date: Jun. 29, 2017

(65) Prior Publication Data
US 2019/0009988 A1 Jan. 10, 2019

(30) Foreign Application Priority Data
Dec. 22, 2015 (DE) .......................... 10 2015 122 488

(51) Int. Cl.
*B65G 17/42* (2006.01)
*B65G 17/46* (2006.01)
*B65G 17/06* (2006.01)

(52) U.S. Cl.
CPC ........... *B65G 17/46* (2013.01); *B65G 17/067* (2013.01)

(58) Field of Classification Search
CPC .... B65G 17/067; B65G 17/046; B65G 17/06; B65G 17/42
USPC ....... 198/465.2, 465.3, 469.1, 803.14, 803.2, 198/867.11, 867.15
See application file for complete search history.

(56) References Cited

U.S. PATENT DOCUMENTS

| | | | | |
|---|---|---|---|---|
| 763,174 | A * | 6/1904 | Goebel | B65G 49/0418 134/71 |
| 2,329,687 | A * | 9/1943 | Becker | A23L 3/001 198/803.2 |
| 2,974,838 | A * | 3/1961 | Parham | B41F 17/38 223/76 |

(Continued)

FOREIGN PATENT DOCUMENTS

| CH | 530307 A | 11/1972 |
|---|---|---|
| CN | 104411282 A | 3/2015 |

(Continued)

*Primary Examiner* — Joseph A Dillon, Jr.
(74) *Attorney, Agent, or Firm* — The Webb Law Firm (57) ABSTRACT

A device for transporting packagings, in particular packagings for foodstuffs, is disclosed. The device may include a frame, at least two pulleys mounted rotatably on the frame, at least one traction means which runs around the pulleys, and a plurality of mounts for receiving the packagings. The mounts may be connected to the traction means. To also allow the packagings to be precisely positioned in the case of long transportation distances, the traction means may be a belt, in particular a synchronous belt. A method for use of a device of this type for transporting packagings for foodstuffs, in particular composite packagings for foodstuffs, is also disclosed.

11 Claims, 5 Drawing Sheets

(56) References Cited

U.S. PATENT DOCUMENTS

| | | | | |
|---|---|---|---|---|
| 3,034,636 | A * | 5/1962 | Manna | B65G 17/18 198/798 |
| 3,150,765 | A * | 9/1964 | Ellis | B65G 17/063 198/867.14 |
| 3,244,458 | A * | 4/1966 | Frost | B62D 55/247 305/34 |
| 3,587,829 | A * | 6/1971 | Sorensen | B65B 7/164 198/867.12 |
| 3,637,091 | A * | 1/1972 | Mickelson | B65G 17/02 198/711 |
| 3,783,994 | A | 1/1974 | Tomalty | |
| 3,961,701 | A * | 6/1976 | Paddock | B65G 17/32 198/803.11 |
| 4,494,456 | A * | 1/1985 | Pink | B41F 17/24 101/35 |
| 4,699,583 | A * | 10/1987 | Grigoli | A23G 9/26 198/465.2 |
| 4,954,069 | A * | 9/1990 | Friedwald | A23G 1/205 198/712 |
| 5,199,840 | A * | 4/1993 | Castaldi | B65G 1/0435 198/469.1 |
| 5,287,957 | A * | 2/1994 | Iuchi | B65B 43/54 198/803.14 |
| 6,315,108 | B1 * | 11/2001 | Bootsman | B65B 5/106 198/619 |
| 7,183,527 | B2 * | 2/2007 | Germain | B65B 15/58 219/701 |
| 8,544,632 | B2 * | 10/2013 | Gillet | B65G 17/44 198/465.2 |
| 8,678,182 | B2 * | 3/2014 | Junk | B65B 43/52 198/803.14 |
| 2003/0234159 | A1 * | 12/2003 | Hoveling | B61B 10/04 198/465.1 |
| 2004/0195079 | A1 | 10/2004 | Webster et al. | |
| 2005/0109422 | A1 | 5/2005 | Duman | |
| 2005/0217975 | A1 * | 10/2005 | Chan | B65G 17/123 198/465.3 |
| 2006/0070858 | A1 * | 4/2006 | de Swardt | B01D 33/333 198/803.2 |
| 2008/0199286 | A1 * | 8/2008 | Fujita | A21C 13/02 414/287 |
| 2009/0000915 | A1 * | 1/2009 | Nadreau | A01K 45/00 198/469.1 |
| 2010/0126829 | A1 * | 5/2010 | Nicolet | H01L 21/67086 198/465.3 |
| 2013/0126312 | A1 * | 5/2013 | Junk | B65B 43/52 198/803.14 |
| 2015/0291361 | A1 | 10/2015 | Schneider et al. | |
| 2017/0113876 | A1 * | 4/2017 | Jager | A01D 61/02 |
| 2017/0197809 | A1 * | 7/2017 | Matheisl | B65G 17/067 |
| 2018/0222681 | A1 * | 8/2018 | Elferink | A01K 43/00 |

FOREIGN PATENT DOCUMENTS

| | | |
|---|---|---|
| DE | 19581515 T1 | 2/1997 |
| DE | 69915387 T2 | 2/2005 |
| DE | 10360082 A1 | 7/2005 |
| DE | 102010050502 A1 | 5/2012 |
| DE | 102013110027 B3 | 1/2015 |
| EP | 2870955 A1 | 5/2015 |
| JP | 4333408 A | 11/1992 |
| JP | 200460783 A | 2/2004 |
| JP | 2009112217 A | 5/2009 |
| WO | 2015036163 A1 | 3/2015 |

* cited by examiner

DEVICE FOR TRANSPORTING PACKAGINGS

CROSS-REFERENCE TO RELATED APPLICATIONS

This application is the United States national phase of International Application No. PCT/EP2016/080277 filed Dec. 8, 2016, and claims priority to German Patent Application No. 10 2015 122 488.7 filed Dec. 22, 2015, the disclosures of which are hereby incorporated in their entirety by reference.

BACKGROUND OF THE INVENTION

Field of the Invention

The invention relates to a device for transporting packagings, in particular packagings for foodstuffs, comprising: a frame, at least two pulleys mounted rotatably on the frame, at least one traction means which runs around the pulleys, and a plurality of mounts for receiving the packagings, the mounts being connected to the traction means.

The invention also relates to the use of a device of this type for transporting packagings for foodstuffs, in particular composite packagings for foodstuffs.

Description of Related Art

In the packaging technology sector, all kinds of devices are known which are able to transport packagings. Devices of this type are used in particular for transporting the packagings before, during and after they have been filled. For this purpose, the packagings have to be moved to different processing and filling stations. The processing stations include, for example, stations for folding and sealing the lower sides (bottom region) of the packagings as well as stations for folding and sealing the upper sides (gable region) of the packagings. The purpose of the filling station is to introduce the contents, which are typically liquid, such as milk, juice, yoghurt or soup into the packagings.

The known devices are often provided with mounts, into which the packagings are inserted or clamped. The mounts allow an accurate positioning of the packagings. A precise orientation of the packagings is essential for an accurate processing and filling of the packagings. During processing of the packagings, a high degree of precision is required so that the tools (for example folding tool, sealing tool) are able to engage in the intended areas of the packagings. This is important in order not to damage the packaging material, which is often only a few tenths of a millimetre thick, or the individual laminate layers thereof which are even thinner. A high degree of precision is also required during the filling procedure of the packagings, so that the contents can be introduced into the packagings in the required manner, i.e. as far as possible without the formation of foam and free from splashes. For this purpose, a very precise relative position between filing nozzles and packagings is required.

Devices for transporting packagings are known, for example, from DE 10 2010 050 502 A1 and CH 530 307 A. The devices described therein have as the traction means revolving metal chains, onto which cells for receiving the packagings ("cell chain") are fastened. These devices are therefore also known as "chain conveyors" or "horizontal chain conveyors". Chains have the advantage that they can transmit very high tensile forces in a form-locking and thereby slip-free manner. A further advantage of metal chains is that the cells for receiving the packagings can be easily connected to the chain links, for example they can be welded with the link plates of the chain or they can engage in the gaps in the chain.

However, it has proved to be a disadvantage of the known devices that chains have a relatively high elongation of approximately 2% and more. The elongation results from the fact that the chain links cannot be joined together in a manner which is absolutely free from clearance. Due to the high number of chain links, low tolerances between the individual chain links also add up to a significant overall elongation. The elongation of chains is countered to some extent by tensioning elements. However, the use of tensioning devices has little effect, particularly in the case of tensile loads which change rapidly. Tensile loads which change occur, for example, in the case of transportation devices which are operated in cycles, i.e. intermittently. Due to the chain elongation, it is frequently impossible to meet the initially described high demands for a precise positioning of the packagings.

SUMMARY OF THE INVENTION

Therefore, the object of the invention is to configure and develop the device which was described at the outset and has been previously explained in detail such that it is possible to precisely position the packagings even in the case of long transportation distances.

This object is achieved with a device according to the preamble of claim 1 in that the traction means is a belt, in particular a synchronous belt.

The device according to the invention is used for transporting packagings, in particular packagings for foodstuffs. The packagings can be, for example, packagings of composite material, i.e. composite packagings. The material used can be, for example, a composite of a plurality of thin layers of paper, cardboard, plastics or metal, in particular aluminium. The device firstly comprises a frame. The frame is preferably produced from metal and serves as a stand for the device and is also used to mount components of the device on the frame. The device also comprises at least two pulleys which are mounted rotatably on the frame and are also known as belt pulleys. The pulleys are preferably round and can have means, for example teeth, for the form-locking transmission of forces or torques. Furthermore, the device has at least one traction means which runs around the pulleys. The traction means can be in particular a form-locking traction means. Finally, the device has a plurality of mounts for receiving the packagings, the mounts being connected to the traction element. The mounts can be configured, for example as rectangular, upwardly open recesses, into which the packagings can be placed. The mounts can be connected directly or indirectly, i.e. via further components, to the traction means. The purpose of the connection is for the mounts and the packagings standing therein to be able to be moved by the traction means.

The invention proposes that the traction means is a belt, in particular a synchronous belt. It is preferably a toothed belt. Toothed belts are form-locking drive or transportation elements which have teeth at regular intervals. The toothed belt loops around the pulleys which can have tooth spaces, the spacings of which correspond to the spacings of the teeth of the toothed belt. In this way, the teeth of the toothed belt can engage in the tooth spaces of the pulleys and can form a form-locking connection. Due to the form-locking connection, toothed belts, unlike flat belts or V-belts, have a synchronous run and a particularly high efficiency. The belt can be produced, partly or completely, from plastics, for example.

Compared to chains, belts provide the following advantages: belts do not require lubrication by oils or grease and can therefore satisfy strict hygiene requirements which often exist for the filling of foodstuffs (for example sterile conditions). Furthermore, due to their continuous integral structure, belts have a shorter elongation than chains which consist of links, which allows the packagings to be positioned very precisely. In addition, the acoustic and vibratory behaviour of belts is better than that of chains. Furthermore, belts can provide an improved concentricity, as the "polygon effect", known from chains which run on toothed wheels occurs to a lesser extent. Fewer impulses are thereby also exerted on the material to be transported. In addition, belts are able to transmit not only tensile forces, but also, to a limited extent, compressive forces. This has advantages particularly in the case of cyclically operated transportation devices, because there the packagings have to be alternately accelerated and decelerated.

An embodiment of the device is distinguished by four rotatably mounted pulleys and by two belts which run around the pulleys. Particularly wide transportation devices can also be realised by four rotatably mounted pulleys and by two belts running around the pulleys. A great width can be utilised, for example, to transport a plurality of adjacently standing packagings. Preferably, two rotatably mounted pulleys are arranged on one side of the device and are looped by the first belt. The two other rotatably mounted pulleys are preferably arranged on the other side of the device and are looped by the second belt. To achieve a synchronous run of all the pulleys, at least two of the pulleys are preferably rigidly interconnected. Two pulleys in each case are preferably arranged on the same axis of rotation. As an alternative, it is possible to achieve a synchronous run via a plurality of drives, in particular via two drives, preferably via two servomotors per axis of rotation (or per pair of pulleys). In this respect, it is advantageous that it is possible to dispense with a physically formed and continuous rigid axis. Thus the space between the pulleys can remain free from components, which can significantly reduce the risk of contamination of a processing or filling station, optionally arranged thereabove, particularly when used inside a device for producing and filling composite packagings. In such a case, the exact required synchronism of the pulleys can then preferably be achieved in that the drives follow a common control/regulating means (frequently also called a "master").

A further embodiment of the invention is characterised by four rotatably mounted pulleys and by four belts running around the pulleys. This embodiment can also provide particularly wide transportation devices. Preferably, two rotatably mounted pulleys are arranged on one side of the device and are looped by the first and the second belt. The two other rotatably mounted pulleys are preferably arranged on the other side of the device and are looped by the third and the fourth belt. Thus, each pulley is looped by two adjacently arranged belts. This has the advantage, for example, that belts with belt fasteners can be used particularly effectively. Here, the belt fasteners of two adjacent belts are preferably arranged offset from one another in the direction of transport by such an extent that the two belt fasteners are never located at the same time in the same side of the belt. In other words, one belt fastener should be on the tight side while the other belt fastener is on the slack side. This measure ensures that the belt whose fastener is on the slack side can be loaded in the same way or almost in the same way as an otherwise identically constructed belt or belt fastener. However, the adjoining belt which is also moving around the same pulley, and the fastener of which is now on the tight side, can only be loaded with a partial load in this position compared to an otherwise identically constructed belt without a fastener. Thus the two belts can be jointly loaded with a load in any position of a revolution, which load is above the partial load and below the 100% nominal load.

The use of a plurality of belts per pulley also has the advantage that different belt tensions can be adjusted in the individual belts, which can be used, for example, for an axial self-centring of the belts or pulleys.

Alternatively, it can be provided that two pulleys in each case are arranged on the same rotational axis and at least two of the pulleys are rigidly interconnected.

A further embodiment of the device provides that each pulley is looped by at least two belts. Irrespective of the number of pulleys, this embodiment also has the advantage that when belts with belt fasteners are used, the disadvantageous effect of the belt fasteners (lower tensile strength and greater expansion in the region of the belt fastener) can be compensated by an offset arrangement of the belt fasteners. Moreover, different belt tensions can be set. This embodiment can be implemented in a particularly practical way in that pulleys are wider than the belts, so that a plurality of belts can run next to one another on the same pulley.

A further embodiment of the device provides that the pulleys are mounted rotatably about at least two horizontal rotational axes which are arranged parallel to one another. Due to the horizontal course of the rotational axes, the belts run in two superimposed planes. The two rotational axes are preferably arranged at the same height and all the pulleys are the same size so that the belts run in two horizontal planes which are positioned in parallel one on top of the other. Horizontally running transportation planes have the advantage that the packagings are also transported in a horizontal plane. This has the advantage that the packagings are particularly easily accessible from the top and stand vertically in the mounts so that the contents cannot escape from the packaging which is still open at the top.

A further embodiment of the device is distinguished by a plurality of crossbars which each have a plurality of mounts for receiving the packagings. The transportation capacity of the device can be increased by crossbars having a plurality of mounts. The crossbars also have the advantage that not every mount has to be directly connected to the belts; instead, all the mounts can be indirectly connected to the belts by the crossbars. Furthermore, the crossbars can be configured to be interchangeable so that, for example, packagings of different sizes can be transported on the same device. The crossbars preferably have at least four, in particular at least six mounts.

A further embodiment of the device is characterised by a plurality of adapter elements which are connected to the belts. Adapter elements provide connection options for different mounts and crossbars. The mounts and crossbars are thus not connected to the belts directly, but indirectly via the adapter elements. This has the advantage that the adapter elements always remain connected to the belts and can thus be optimally adapted to the shape of the belts. Furthermore, the adapter elements can take on the guidance of the mounts and crossbars.

Regarding this embodiment of the device, it is further proposed that each adapter element has at least one roller. Rollers allow the adapter elements to take on the guidance of the mounts and crossbars in a particularly effective manner. For example, the rollers can roll against or on the frame of the device to prevent the belts from sagging. Thus a separation of functions is to be achieved: the belt ensures a movement of the mounts and crossbars in the transportation direction, while the rollers support the mounts and crossbars in a vertical direction. Each adapter element preferably has two rollers which are arranged in tandem in the transportation direction. This ensures a defined position of the mounts and crossbars.

A further embodiment of the device provides that each crossbar is connected to different belts by two adapter elements. In particular, it can be provided that each crossbar is connected to different belts by two adapter elements which are arranged at opposite ends of the crossbar. Since each crossbar is connected to a plurality of different belts by two adapter elements, a particularly precise guidance and positioning of the packagings can also be achieved in the case of long crossbars.

The device can be supplemented by at least two rails for guiding the adapter elements. Rails can fix the path of the adapter elements in a particularly accurate manner. Rails are particularly advantageous in the case of adapter elements with rollers, because the rollers can roll on the rails, and thereby allow a continuous guidance of the adapter elements. The rails are preferably attached to the frame of the device. A plastics strip, in particular a rubber strip is preferably attached to the rails or is introduced into the rails. The strip can adjust the adhesion characteristics and slide characteristics in a variable manner (for example good adhesion in the case of adapter elements with rollers, good slide characteristics in the case of adapter elements without rollers).

A development of the invention provides that the belts have reinforcements. The belt can be produced from plastics. To increase the tensile strength, the belt can have reinforcing traction elements consisting of metal or of particularly tensile fibres. The traction element can be, for example metal wires, in particular steel wires which are encased by the basic material of the belt, for example plastics. Plastics are distinguished in particular by their low cost, their high resilience and by the possibility of a particularly variable shaping. Steel traction elements are distinguished by their very high tensile strength. By embedding steel traction elements in the plastics, it is possible to advantageously combine the characteristics of both materials. Alternatively, the traction elements can be other tensile materials, for example glass fibres (Kevlar), carbon fibres or textile fibres.

A further embodiment of the device provides that the belts have non-reinforced regions with holes. The non-reinforced regions have the advantage that in these regions, the belts can have continuous holes for attaching connection parts, without having to cut through the reinforcements. The connection parts can be, for example the adapter elements. The holes preferably run from the rear side to the front side of the belt, so that, in contrast to a hole through the entire width of the teeth, the shortest path through the belt is chosen. The advantage of holes which are as short as possible is that it is possible to achieve a connection with a very high tension, without thereby fearing a deformation of the belt.

A development of the device provides that the belts have a belt fastener. A belt fastener is understood as meaning a device for opening and closing a belt. The belt fastener can be, for example a belt fastener known from DE 10 2013 110 027 B3. Compared to continuous belts, belts with belt fasteners have the advantage that the belts can be opened and closed again, like a waistbelt, for assembly and disassembly purposes. If a plurality of belts is provided, the belt fasteners should preferably be arranged offset relative to one another.

Finally, a further embodiment of the device provides that the belts have a different tension. The extent of the tension can influence the axial position of the belts or pulleys. In particular, when one pulley is looped by a plurality of belts, it can be appropriate to adjust different belt tensions in order to generate a specific force transversely to the transportation direction which can be compensated by an opposing force from the oppositely arranged belts.

A self-centring of the belts is particularly important in the field of foodstuff-processing devices, because otherwise the belt or belts have to be guided laterally, which also always directly entails abrasion of the belt. However, abraded particles can contaminate foodstuffs, for which odours or vapours which may already be developing can suffice. In the production of composite packagings for liquid or pasty foodstuffs, which in particular are to be packaged aseptically, another complicating factor here is that the production is linked to high passage or clock times so that the risk of fine particles which are released from the belt and are optionally contaminated cannot be completely ruled out for the contents of the packaging which are to be protected.

For a lateral guidance and to avoid abrasion, it is known to guide flat belts over an arched or crowned pivot or pulley. However, on the one hand this cannot be transferred to the use of a synchronous belt, for example a toothed belt, and on the other hand it has the disadvantage that the tensions arising in the belt are concentrated over a narrow central partial region of the belt and thus the belt can only be loaded to a very small proportion of its nominal load.

If the belt tensions of at least two belts are adjusted differently, which belts are located on the same pulley during use and are preferably coupled mechanically, a self-centring of the belt pairing can be achieved if the differences in tension approximately cancel each other out. A mechanical coupling can be achieved, for example by the belts contacting each other on their side faces. However, in order to completely avoid the risk of abrasion, here a "mechanical coupling" is to be understood as meaning a coupling which rules out or at least substantially rules out a relative movement of the belts among one another. A bridge or a crossbar, for example, can be provided for this purpose. It is particularly preferred to provide a plurality of bridges or crossbars over the length of the belts.

If, for example, two pulleys are present and if two belts are respectively located on the pulleys, it is thus possible to achieve a self-centring in that the belt fasteners of the respectively inner belts or of the respectively outer belts are located in the same side of the belt during the revolving motion, and the tension in the belt fasteners, being respectively coordinated, is adjusted slightly above or slightly below the belt partners, the fastener of which is located in the opposite span during the revolving motion.

The device described above is particularly suitable in all the presented embodiments for use in transporting packagings for foodstuffs, particularly composite packagings for foodstuffs. The high suitability is found particularly in the previously described advantages of belts, such as the dispensation of lubricant and a low elongation.

BRIEF DESCRIPTION OF THE DRAWINGS

In the following, the invention will be described with reference to drawings showing only one preferred embodiment.

DESCRIPTION OF THE INVENTION

Figure 1:
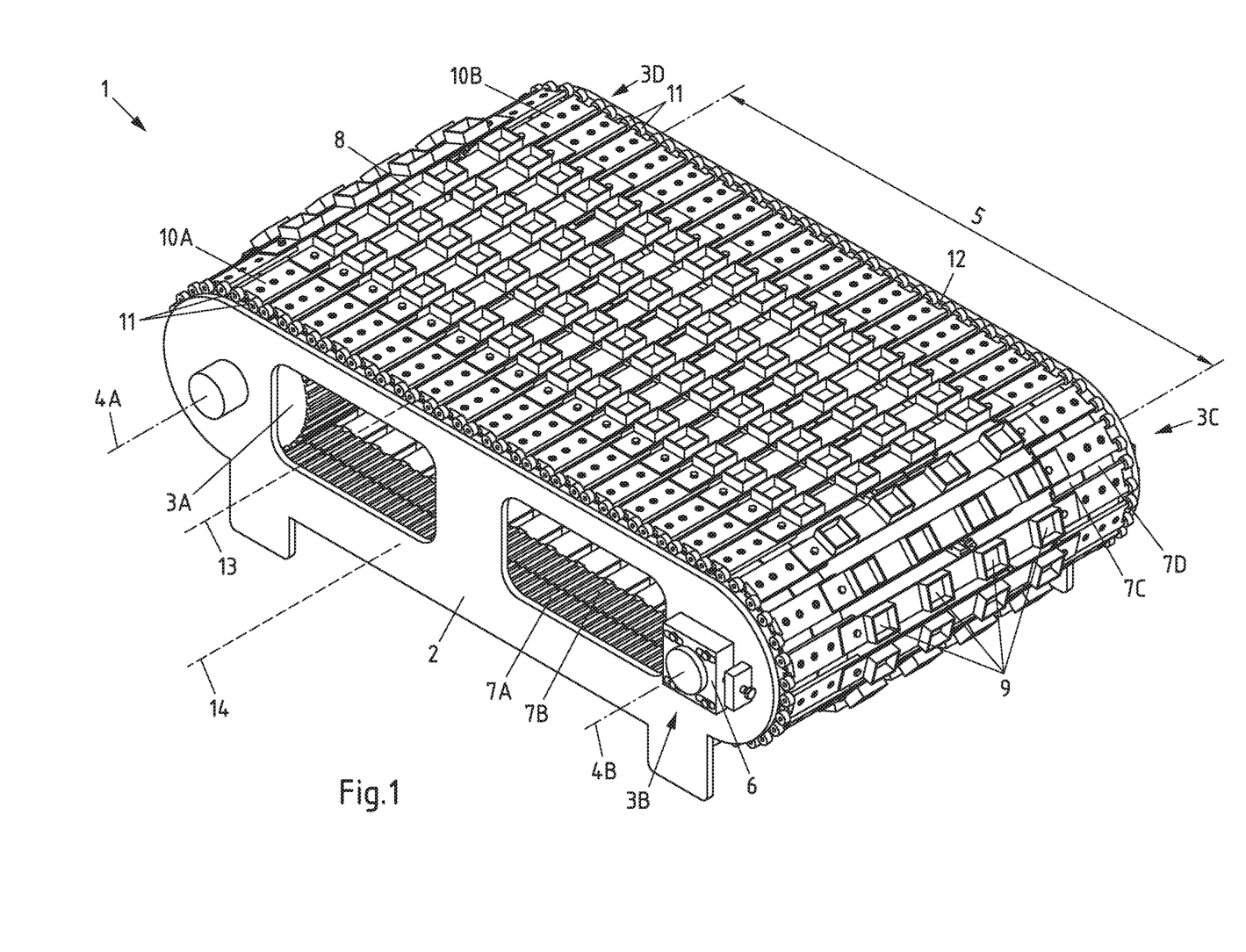
FIG. 1: is a perspective view of a device according to the invention.

FIG. 1 is a perspective view of a device 1 according to the invention for transporting packagings. The device 1 comprises a frame 2 on which four pulleys 3A, 3B, 3C, 3D are rotatably mounted. The pulleys 3A, 3B, 3C, 3D are round and are the same size. In each case, two pulleys 3A, 3D and 3B, 3C are rigidly interconnected by shafts which are not shown in FIG. 1. The two left-hand pulleys 3A, 3D are mounted rotatably about a rotational axis 4A and the two right-hand pulleys 3B, 3C are mounted rotatably about a rotational axis 4B, the rotational axes 4A and 4B being arranged parallel to one another. Furthermore, the two rotational axes 4A and 4B run horizontally and are arranged at the same height. Formed between the two rotational axes 4A and 4B is an axial distance 5 which can be varied by a tensioning means 6. Four belts 7A, 7B, 7C, 7D loop around the pulleys 3A, 3B, 3C, 3D, two belts 7A, 7B and 7C, 7D being respectively arranged closely next to one another on the same side of the device 1. The two front belts 7A, 7B of the front side of the device 1 loop around the two front pulleys 3A, 3B and the two rear belts 7C, 7D of the rear side of the device 1 loop around the two rear pulleys 3C, 3D.

The belts 7A, 7B of the front side of the device 1 are connected to the belts 7C, 7D of the rear side of the device 1 by a plurality of crossbars 8. Each crossbar 8 has four mounts 9 which are used to receive and transport packagings which are not shown in FIG. 1. The crossbars 8 are connected to belts 7A, 7B, 7C, 7D by adapter elements 10A, 10B, the front adapter elements 10A being connected to the two front belts 7A, 7B and the rear adapter elements 10B being connected to the two rear belts 7C, 7D. Each adapter element 10A, 10B has two rollers 11. The purpose of the rollers 11 is to allow the adapter elements 10A, 10B and the crossbars 8 attached thereto to be guided in a precise manner; their particular function is to guide the adapter elements 10A, 10B and the crossbars 8 attached thereto in portions in a plane. For this purpose, rails 12 are provided, on which the rollers 11 run. In the device 1 which is shown in FIG. 1 and is preferred in this respect, the adapter elements 10A, 10B and the crossbars 8 attached thereto are guided in an upper plane 13 and in a lower plane 14, the upper plane 13 and the lower plane 14 being arranged parallel to one another.

Figure 2A:
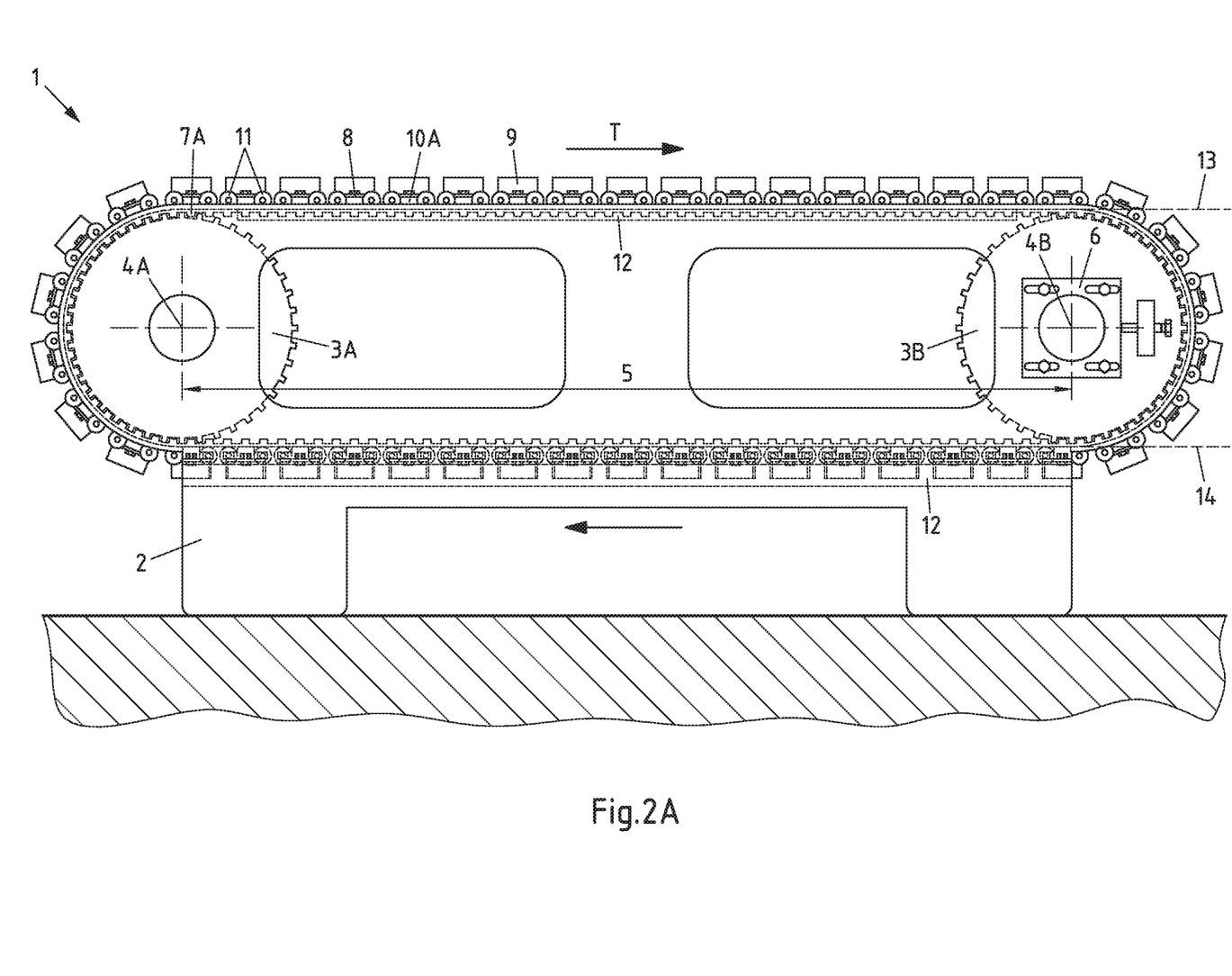
FIG. 2A: is a side view of the device from FIG. 1.

FIG. 2A is a side view of the device 1 from FIG. 1. The regions of the device 1 which have already been described with reference to FIG. 1 have been provided with corresponding reference numerals in FIG. 2A. The preferred direction of transport T of the device 1 is shown schematically by arrows. The side view clearly shows that the mounts 9 are guided in two parallel planes, namely alternately in the upper plane 13 and, upside down, in the lower plane 14. The precise guidance in planes is achieved in that adapter elements 10A, 10B having rollers 11 run on rails 12. This measure avoids a sagging of the tight side and of the slack side which is typical of belt drives.

Figure 2B:
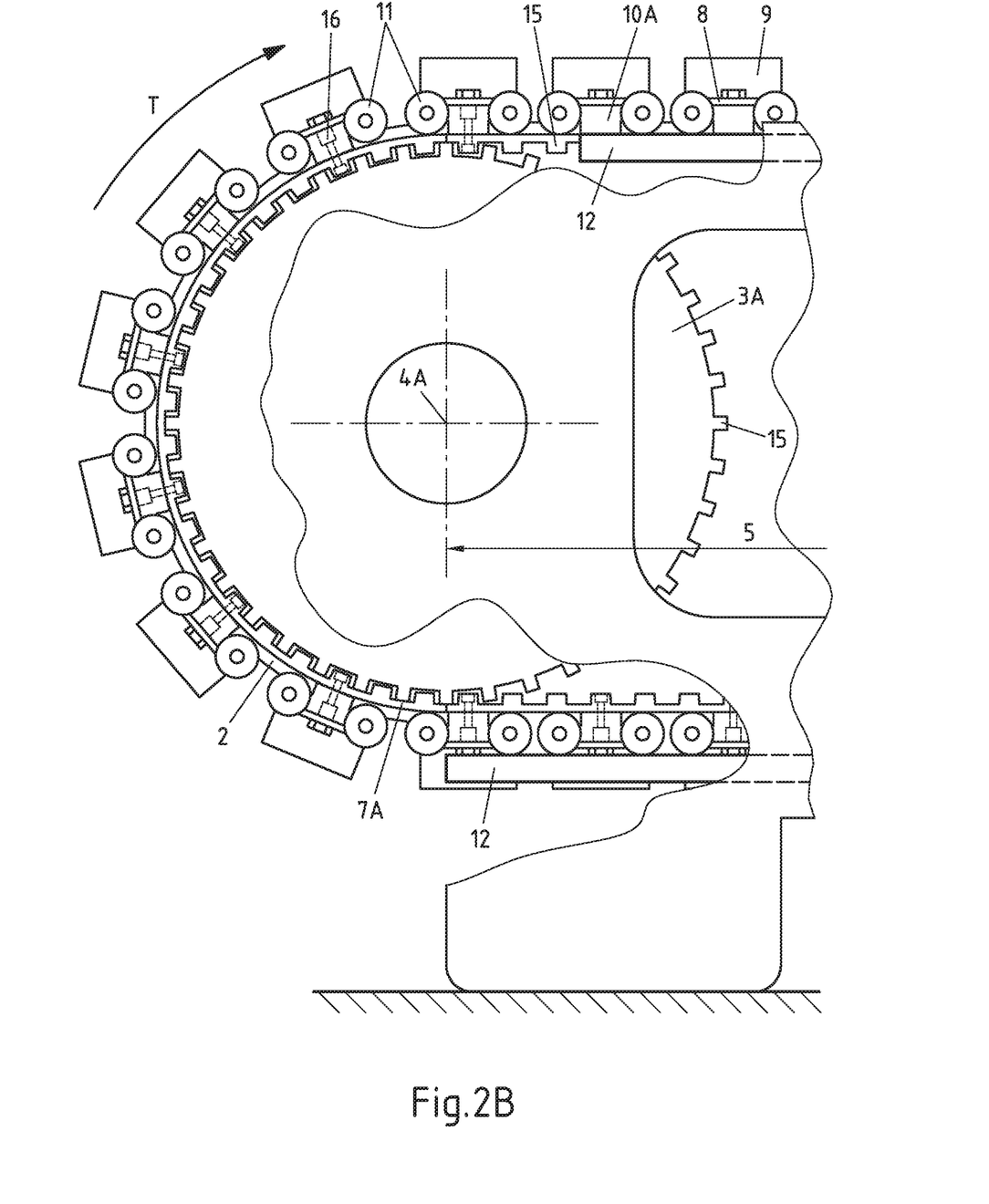
FIG. 2B: is an enlarged view of the device from FIG. 2A.

FIG. 2B is an enlarged view of the device 1 from FIG. 2A. The enlarged and partly broken-away view relates to the region of the rotational axis 4A and of the pulley 3A shown on the left-hand side in FIG. 2A. The regions of the device 1 which have already been described in connection with FIG. 1 and FIG. 2A have also been provided with corresponding reference numerals in FIG. 2B. The enlarged view particularly clearly shows the form-locking connection between the belt 7A and the pulley 3A. To form this form-locking connection, teeth 15 are provided on the belt 7A and on the pulley 3A. The teeth 15 of the belt 7A (and the teeth 15 of the other belts 7B, 7C, 7D not shown in FIG. 2B) and the teeth 15 of the pulley 3A (and the teeth 15 of the other pulleys 3B, 3C, 3D not shown in FIG. 2B) mesh together and ensure a form-locking, slip-free transmission of the drive power. The enlarged view also shows that the crossbars 8 are connected to the adapter element 10A by connection means 16. The connection means 16 can be, for example, detachable connection means such as screws.

Figure 3A:
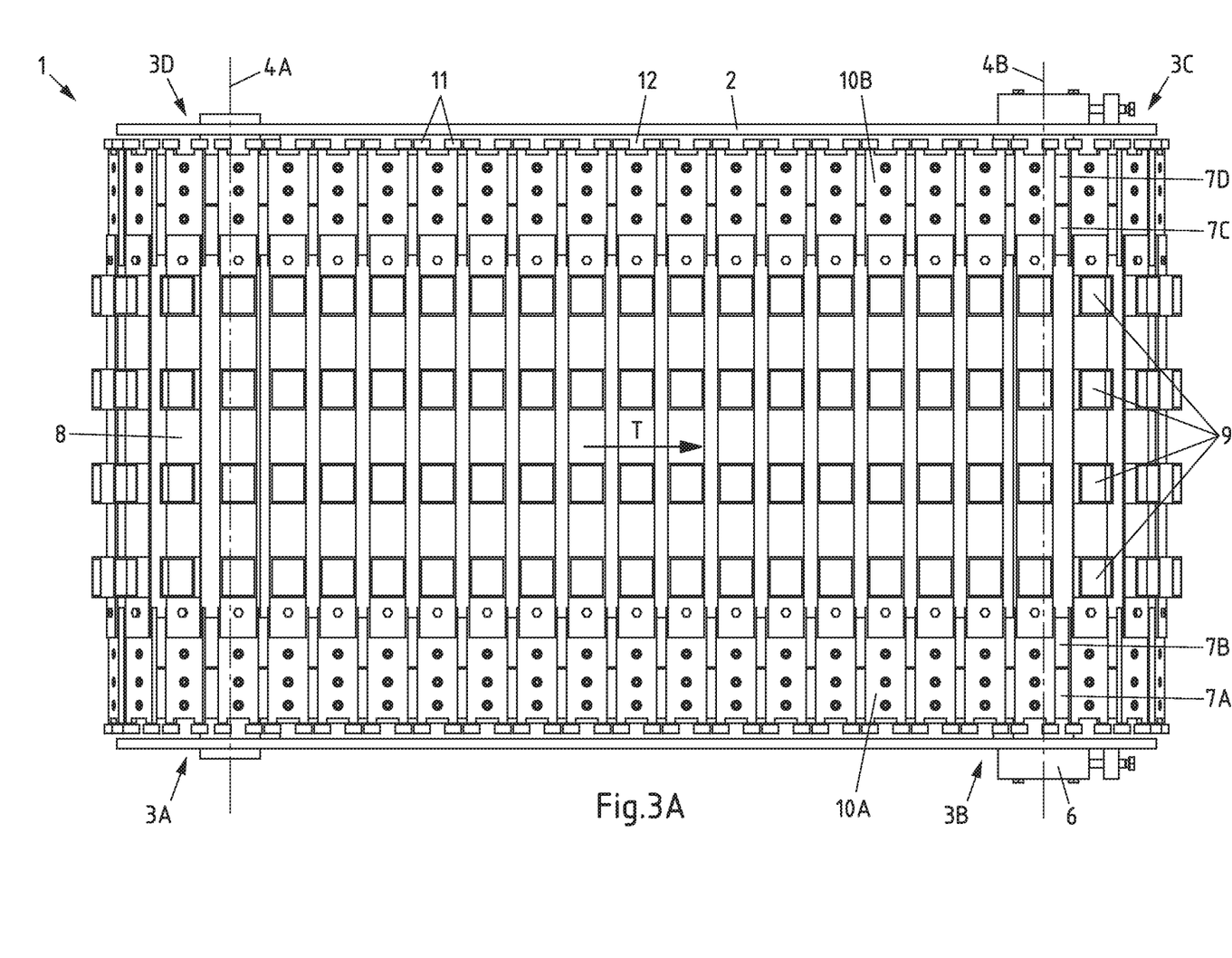
FIG. 3A: is a plan view of the device from FIG. 1.

FIG. 3A is a plan view of the device 1 from FIG. 1. The regions of the device 1 which have already been described in connection with FIG. 1 to FIG. 2B have also been provided with corresponding reference numerals in FIG. 3A. The plan view shows the parallel course of the four belts 7A, 7B, 7C, 7D particularly clearly. The two lower belts 7A, 7B loop around the two pulleys 3A, 3B and the two upper belts 7C, 7D loop around the two pulleys 3C, 3D. The figure also clearly shows that the rollers 11 run on a rail 12 which is delimited laterally by the frame 2. The adapter elements 10A, 10B are connected to the belts 7A, 7B, 7C, 7D in the same mutual spacings, so that the crossbars 9 are also arranged in the same mutual spacings and preferably parallel to one another.

Figure 3B:
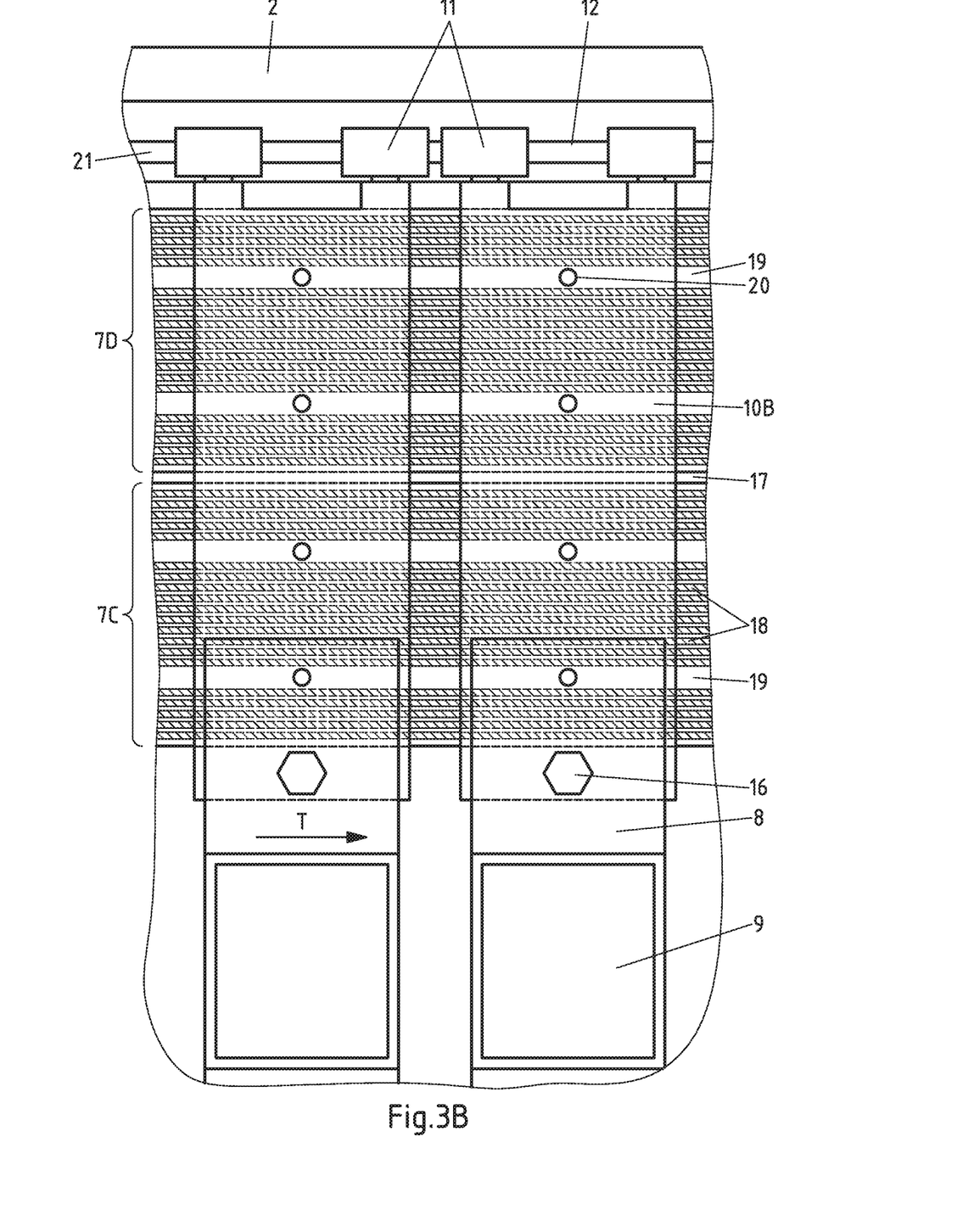
FIG. 3B: is an enlarged view of the device from FIG. 3A.

FIG. 3B is an enlarged view of the device 1 from FIG. 3A. The enlarged view relates to the region of the two upper belts 7C, 7D and to the adapter elements 10B connected thereto. In FIG. 3B as well, the regions of the device 1 which have already been described in connection with FIG. 1 to FIG. 3A have been provided with corresponding reference numerals. The enlarged view shows the construction of the belts 7C, 7D particularly clearly. The two belts 7C, 7D run parallel to one another and are only spaced apart from each other by a narrow gap 17. The two belts 7C, 7D are preferably produced from plastics and have metal reinforcements 18. The reinforcements 18 can be, for example steel wires or tensile fibres which are embedded in the belts 7C, 7D. The characteristics, described in connection with FIG. 3B, of the upper belts 7C, 7D and of the adapter elements 10B connected thereto also apply correspondingly to the two lower belts 7A, 7B and to the adapter elements 10A connected thereto.

The two belts 7C, 7D have two non-reinforced regions 19 in which no reinforcements 18 run. Provided in the region of the non-reinforced regions 19 are holes 20 which are equidistant from one another in the direction of transport T. The openings 20 serve to connect the adapter elements 10B to the belts 7C, 7D in a form-locking manner. This connection can also be produced by connection elements (not shown in FIG. 3B), such as screws. The rollers 11 of the adapter elements 10B preferably run on a synthetic material strip 21 of rubber which is attached to the rail 12 or is introduced into the rail 12.

The belts 7A, 7B, 7C, 7D shown in FIGS. 1 to 3B can have a "belt fastener" for ease of assembly and disassembly. A belt fastener is understood as meaning a device for opening and closing a belt. The belt fastener can be, for example a belt fastener known from DE 10 2013 110 027 B3. The belt fasteners of two adjacent belts 7A, 7B and 7C, 7D are preferably arranged offset from one another by such an extent in the direction of transport T that the two belt fasteners are never located at the same time in the same plane 13, 14 of the device 1.

LIST OF REFERENCE SIGNS

1: device for transporting packagings
2: frame
3A, 3B, 3C, 3D: pulley
4A, 4B: rotational axis
5: axial distance
6: tensioning means
7A, 7B, 7C, 7D: belt
8: crossbar
9: mount
10A, 10B: adapter element
11: roller
12: rail
13: upper plane
14: lower plane
15: teeth
16: connection means
17: gap
18: reinforcement
19: non-reinforced region
20: hole
21: plastics strip
T: direction of transport

The invention claimed is:

1. A device for transporting packagings comprising:
   a frame,
   at least two pulleys mounted rotatably on the frame,
   at least one traction means which runs around the pulleys,
   wherein the traction means is at least one belt,
   a plurality of crossbars which each have a plurality of mounts for receiving the packagings,
   wherein the mounts are connected to the traction means via the crossbars,
   a plurality of adapter elements which are connected to the at least one belt, and
   wherein each adapter element is connected to the at least one belt from at least one of a top and bottom surface
   at least two rails for guiding the adapter elements, and
   wherein each crossbar is connected to different belts by two adapter elements which are arranged at opposite ends of the crossbar.

2. The device according to claim 1, wherein the at least two pulleys comprise four rotatably mounted pulleys and wherein the at least one traction means comprises two belts running around the pulleys.

3. The device according to claim 1, wherein the at least two pulleys comprise four rotatably mounted pulleys and wherein the at least one traction means comprises four belts running around the pulleys.

4. The device according to claim 1, wherein the at least one traction means comprises at least two belts looped around each pulley.

5. The device according to claim 1, wherein the pulleys are mounted rotatably about at least two horizontal rotational axes which are arranged parallel to one another.

6. The device according to claim 1, wherein each adapter element has at least one roller.

7. The device according to claim 1, wherein the belts have reinforcements.

8. The device according to claim 1, wherein the belts have non-reinforced regions with holes.

9. The device according to claim 1, wherein the belts have a belt fastener.

10. The device according to claim 1, wherein the at least one belt is a plurality of belts having different tensions.

11. A method for transporting packagings, comprising:
    using the device according to claim 1 to transport packagings for foodstuffs.

* * * * *